United States Patent
Apte et al.

(10) Patent No.: US 7,797,151 B2
(45) Date of Patent: Sep. 14, 2010

(54) TRANSLATION PROCESS COMPONENT

(76) Inventors: Darshana Apte, 26717 Empire Dr., Novi, MI (US) 48374; Theresa Wall, 3036 Throne St., Murfreesboro, TN (US) 37129; Phil Rector, 122 Copperas Ct., Murfreesboro, TN (US) 37128; Joseph David Barkley, 4732 Forsman Ct., Murfreesboro, TN (US) 37128; Arvind Wadhawan, 1508 Kemah Ct., Brentwood, TN (US) 37027

( * ) Notice: Subject to any disclaimer, the term of this patent is extended or adjusted under 35 U.S.C. 154(b) by 847 days.

(21) Appl. No.: 11/701,746

(22) Filed: Feb. 2, 2007

(65) Prior Publication Data

US 2008/0189096 A1 Aug. 7, 2008

(51) Int. Cl.
G06F 17/20 (2006.01)
G06F 17/28 (2006.01)
G06F 9/44 (2006.01)
G06F 9/45 (2006.01)

(52) U.S. Cl. .............. 704/8; 704/2; 704/5; 717/100; 717/136; 717/168

(58) Field of Classification Search .............. None
See application file for complete search history.

(56) References Cited

U.S. PATENT DOCUMENTS

| 5,678,039 | A | | 10/1997 | Hinks et al. | 395/604 |
| 6,035,121 | A | * | 3/2000 | Chiu et al. | 717/141 |
| 7,318,020 | B1 | * | 1/2008 | Kim | 704/2 |
| 7,552,452 | B2 | * | 6/2009 | McHugh et al. | 719/331 |
| 2003/0182632 | A1 | * | 9/2003 | Murdock et al. | 715/536 |
| 2006/0173671 | A1 | | 8/2006 | Okawa | 704/5 |
| 2006/0287844 | A1 | * | 12/2006 | Rich | 704/2 |

OTHER PUBLICATIONS

Article: Raya R: "XML in Localisation: Use XLIFF to translate documents" Oct. 22, 2004, pp. 1-6, XP002482965.
Article: Anonymous: "A white paper on version 1.1 of the XML Localisation Interchange File Format (XLIFF)" Internet Article, Jul. 22, 2003, pp. 1-33, XP002482966.
PCT Written Opinion for International Application No. PCT/US2006/025445, dated Nov. 24, 2006 (7 pages).
PCT Search Report for International Application No. PCT/US2006/025445, dated Nov. 24, 2006 (3 pages).

* cited by examiner

Primary Examiner—Matthew J Sked

(57) ABSTRACT

A translation tool that facilitates translation of a software product into multiple target human languages without requiring recompilation of any binary deliverables. The translation tool is installed by an end user who wishes to translate the software product into the target human language. The end user does not need any programming knowledge. The translator tool extracts all the strings from various sources in the software product, and displays them on a UI to a translator or exports them to a spreadsheet file. The translator translates all the strings via the UI or by modifying the spreadsheet file and saves the translations. The translator tool uses an MSI utility to package the translated deliverables into an installer. The resulting set of install files are now in the target language and can be deployed without having to recompile any of the binary files (EXEs, DLLs) or other content not requiring translation.

19 Claims, 11 Drawing Sheets

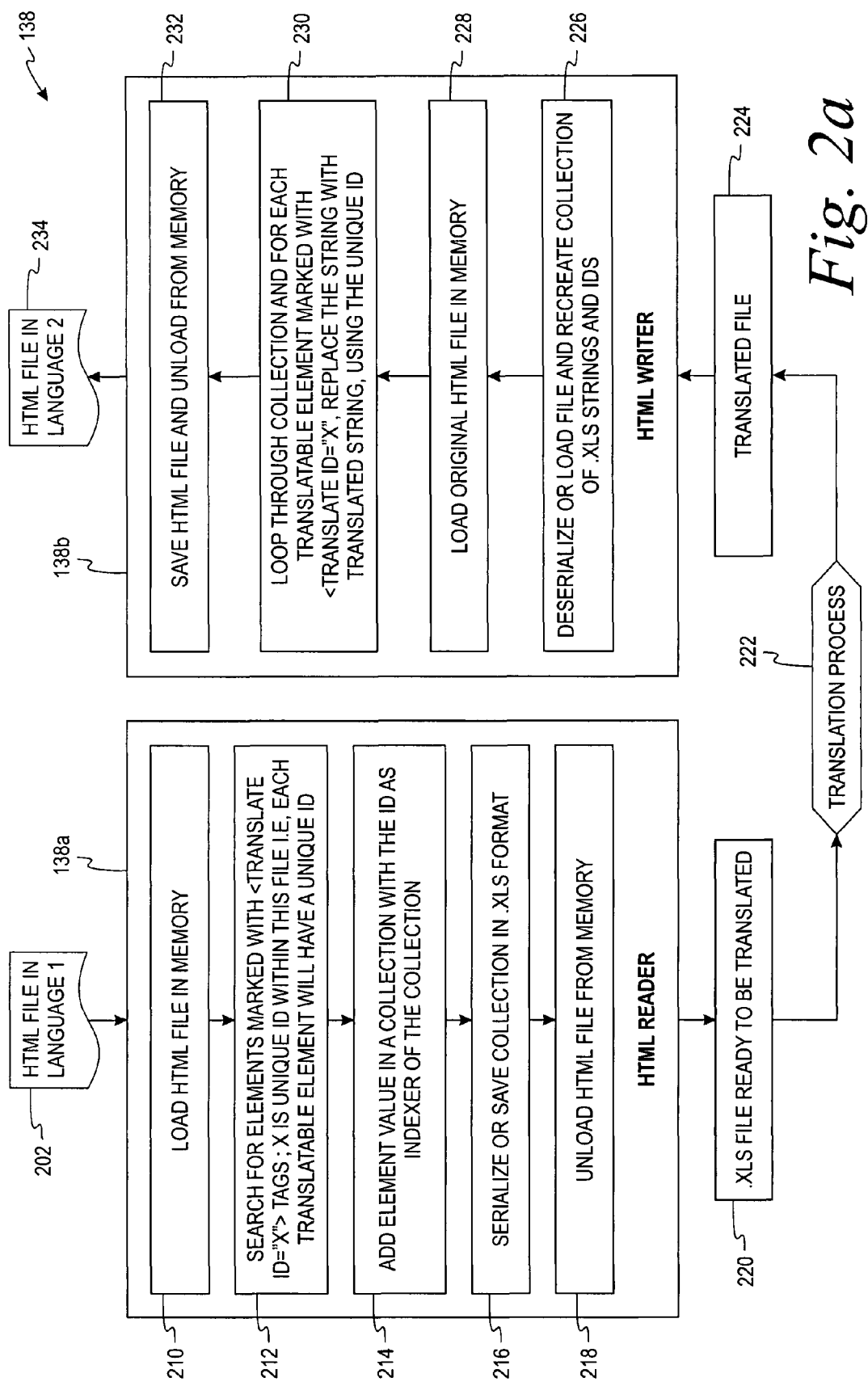

| | A | B | C | D | E | F | G |
|---|---|---|---|---|---|---|---|
| 1 | ID | English | Length | Chinese | ERR_Chinese | (Simplified) | |
| 2 | $Application$ | Prototype_2.0 | | | | | |
| 3 | $Translate Tool$ | 1.0.2235.16693 | | | | | |
| 4 | UI:Prototype:form1.btnexit.text | Exit | 6 | | ERR_INCOMPLETE | | |
| 5 | UI:Prototype:form1.label1.text | Use the translation utility t | 84 | | ERR_INCOMPLETE | | |
| 6 | UI:Prototype:form1.btnreport.text | View Report | 14 | | ERR_INCOMPLETE | | |
| 7 | UI:Prototype:form1.cmblang.text | Select A Language | 22 | | ERR_INCOMPLETE | | |
| 8 | UI:Prototype:form1.caption | Demo Form | 12 | | ERR_INCOMPLETE | | |
| 9 | UI:Prototype:form1.lbltext1.text | This is just a test. | 26 | | ERR_INCOMPLETE | | |
| 10 | UI:Prototype:form1.lbltext2.text | Devices in the Database: | 31 | | ERR_INCOMPLETE | | |
| 11 | DATA:Data:tblDevices:fDeviceName:Device2 | | 9 | | ERR_INCOMPLETE | | |
| 12 | DATA:Data:tblDevices:fDeviceName:Device1 | | 9 | | ERR_INCOMPLETE | | |
| 13 | DATA:Data:tblDevices:fDeviceName:Device4 | | 9 | | ERR_INCOMPLETE | | |
| 14 | DATA:Data:tblDevices:fDeviceName:Device3 | | 9 | | ERR_INCOMPLETE | | |
| 15 | REPORTS:Report.Prototype:column1 | Device Name | 14 | | ERR_INCOMPLETE | | |
| 16 | REPORTS:Report.Prototype:column2 | Device Descitpion | 22 | | ERR_INCOMPLETE | | |
| 17 | REPORTS:Report.Prototype:title | List of the devices in Databa | 40 | | ERR_INCOMPLETE | | |
| 18 | REPORTS:Report.Prototype:total | Total number of devices | 30 | | ERR_INCOMPLETE | | |
| 19 | HTML:\Company:ID_FNAME | First Name | 13 | | ERR_INCOMPLETE | | |
| 20 | HTML:\Company:ID_LINK | Company Global Directory | 34 | | ERR_INCOMPLETE | | |
| 21 | HTML:\Company:ID_BUTTON | Search | 8 | | ERR_INCOMPLETE | | |
| 22 | HTML:\Company:ID_TEXT | Find employees with words rel | 202 | | ERR_INCOMPLETE | | |
| 23 | HTML:\Company:ID_TITTLE | Corporate Directory | 25 | | ERR_INCOMPLETE | | |
| 24 | HTML:\Company:ID_LNAME | Last Name | 12 | | ERR_INCOMPLETE | | |
| 25 | HTML:\Company:ID_SEARCH | Word Search | 14 | | ERR_INCOMPLETE | | |
| 26 | HTML:\Company:ID_USCAN | US and Canada | 20 | | ERR_INCOMPLETE | | |

*Fig. 5a*

| | A | B | C | D | E | F |
|---|---|---|---|---|---|---|
| 1 | ID | English | Length | Chinese (Simplified) | ERR_Chinese (Simplified) | |
| 2 | $Application$ | | | | | |
| 3 | $Translate Tool$ | 1.0.2235.19985 | | | | |
| 4 | UI:Prototype:form1.btnexit.text | Exit | 6 | 退出 | ERR_NOERROR | |
| 5 | UI:Prototype:form1.label1.text | Use the translatio | 84 | | ERR_NOERROR | |
| 6 | UI:Prototype:form1.btnreport.te | View Report | 14 | 阅读报表 | ERR_NOERROR | |
| 7 | UI:Prototype:form1.cmblang.text | Select A Language | 22 | 选择一种语言 | ERR_NOERROR | |
| 8 | UI:Prototype:form1.caption | Demo Form | 12 | 演示 | ERR_NOERROR | |
| 9 | UI:Prototype:form1.lbltext1.tex | This is just a tes | 26 | 测试 | ERR_NOERROR | |
| 10 | UI:Prototype:form1.lbltext2.tex | Devices in the Dat | 31 | 数据库中的设备 | ERR_NOERROR | |
| 11 | DATA:Data:tblDevices:fDeviceNam | Device2 | 9 | 设备 2 | ERR_NOERROR | |
| 12 | DATA:Data:tblDevices:fDeviceNam | Device1 | 9 | 设备 1 | ERR_NOERROR | |
| 13 | DATA:Data:tblDevices:fDeviceNam | Device4 | 9 | 设备 4 | ERR_NOERROR | |
| 14 | DATA:Data:tblDevices:fDeviceNam | Device3 | 9 | 设备 3 | ERR_NOERROR | |
| 15 | REPORTS:Report.Prototype:column | Device Name | 14 | 设备名称 | ERR_NOERROR | |
| 16 | REPORTS:Report.Prototype:column | Device Descitpion | 22 | 设备描述 | ERR_NOERROR | |
| 17 | REPORTS:Report.Prototype:title | List of the device | 40 | 在数据库中的设备 | ERR_NOERROR | |
| 18 | REPORTS:Report.Prototype:total | Total number of de | 30 | 设备总数 | ERR_NOERROR | |
| 19 | HTML:\Company:ID_FNAME | First Name | 13 | 名字 | ERR_NOERROR | |
| 20 | HTML:\Company:ID_LINK | Company Global | 34 | COMPANY 全球指南 | ERR_NOERROR | |
| 21 | HTML:\Company:ID_BUTTON | Search | 8 | 检索 | ERR_NOERROR | |
| 22 | HTML:\Company:ID_TEXT | Find employees wit | 202 | 寻找一雇员根据职称或经验 | TXT_TOOLONG | |
| 23 | HTML:\Company:ID_TITTLE | Corporate Director | 25 | COMPANY | ERR_NOERROR | |
| 24 | HTML:\Company:ID_LNAME | Last Name | 12 | 姓氏 | ERR_NOERROR | |
| 25 | HTML:\Company:ID_SEARCH | Word Search | 14 | 检索 | ERR_NOERROR | |
| 26 | HTML:\Company:ID_USCAN | US and Canada | 20 | 美国和加拿大 | ERR_NOERROR | |

Fig. 5b

TRANSLATION PROCESS COMPONENT

CROSS-REFERENCE TO RELATED APPLICATION

This application is related to co-pending U.S. patent application Ser. No. 11/433,307, entitled "Globalization Component," filed May 11, 2006 (SPL-64/47181-00314USPT), the entirety of which is incorporated herein by reference.

FIELD OF THE INVENTION

This invention is directed generally to translation systems and methods and more specifically to a system and method for translating software into a target human language without requiring recompilation of binaries.

BACKGROUND OF THE INVENTION

Many software programs are written with a view toward translating them into multiple human languages for multicultural distribution (a process known as globalization). One software development platform used for such purpose is the .NET Framework by Microsoft® that provides a large standard library from which software developers can develop assemblies, which are basically code libraries. In the Microsoft® Windows® environment, an assembly takes the form of a process assembly (EXE) or a library assembly (DLL). The code in an assembly is partially compiled into a Common Intermediate Language (CIL), which is then fully compiled into machine language at runtime by a Common Language Runtime (CLR) virtual machine (VM). The standard NET framework libraries include, among other things, standard classes, a resource manager, and forms.

When software is shipped to customers that speak different human languages, the software must be translated from one human language to a target human language. Such translations must be performed in conjunction with third-party translation services as well as involve software design engineers to recompile the translated software. In addition, software typically translated as a separate project after an initial English release by a third party company must be recertified by a test laboratory. Such recertification is costly and time consuming. Because of these factors, software vendors are sometimes limited by their ability to create translations of the software. Because the translation process is performed after the creation of the software, the translations are prone to error and delays because such issues cannot be adequately planned for when initially developing the software.

After the installation package is translated, it may need to be modified for the target operating system (OS), and recompiled manually by the software designer to deploy the translated deliverables. In short, the translation process requires the ongoing involvement of the software designer following completion of the translation.

Moreover, in power monitoring systems, the application software that handles data monitoring and reporting may instruct operators to interact with the power monitoring devices in a manner that involves a great risk of harm, even life-threatening harm, to the operator. As a result, the instructions provided by the power monitoring software must be accurate to avoid confusion as to how to operate or configure properly the power monitoring devices. When the software is being translated, it is imperative that the resource strings be translated accurately. Errors in translations or translations that are too long to fit within an allocated pixel area can result in improper, vague, or incomplete instructions being provided to the operator.

Thus, a need exists for an improved apparatus and method for automated translation of software into different languages without having to recompile the binary and other non-localizable deliverables. There is also a need for a system to perform translation from different sources of text strings to be translated. Another need exists for a translation system that facilitates third-party translation by importing and exporting strings to be translated and translated strings in a common format. Another need exists for a translation tool that allows translation of software to different languages without making significant software design changes. Still another need exists for a translation process that ensures that all strings are translated and that the translated strings are validated for pixel length to ensure that the entire translated string will be displayed to the operator.

The aspects of the present invention described herein are directed to satisfying one or more of these and other needs.

SUMMARY OF THE INVENTION

In an aspect of the present invention, a translation method includes compiling a set of files including non-localizable files and localizable files into a set of install files, the localizable files including string data from at least one source in a first human language. The non-localizable files may include executable binary files. The at least one source may be in HTML, SQL or .NET resource formats. The method further includes extracting the string data and exporting the extracted string data to a formatted file, such as a spreadsheet file. The method further includes receiving a translated formatted file that includes translated string data, the translated string data corresponding to the extracted string data that has been at least partially translated from the first human language into a target human language. The method further includes importing the translated string data into the localizable files to produce translated localizable files and replacing the localizable files with translated localizable files that includes the imported translated string data. The method further includes packaging the translated localizable files together with the non-localizable files into a set of target install files without requiring recompilation of any of the non-localizable files. Preferably, but optionally, the set of files is a power monitoring software product.

The method may further include determining whether the pixel length of a string in the translated string data exceeds a predetermined threshold and, if so, providing an indication that the pixel length of the string is too long. The method may further include translating the extracted string data from the first human language into the target human language to produce the translated string data.

In another aspect of the present invention, a system to translate a software package, which includes a non-localizable file (which may include a binary file) and a localizable file, the localizable file including string data from at least one source (such as in an HTML, SQL or .NET resource format) in a first human language, includes: an extractor to receive the localizable file, a reader module coupled to the extractor, the reader module to extract the string data from the localizable file and export the extracted string data to a formatted file, such as a spreadsheet file; a translator coupled to the reader, the translator to translate the string data from the first human language to a second human language to produce a translated formatted file; and a writer module coupled to the translator, the writer to receive the translated formatted file that includes the translated string data, the translated string data corresponding to the extracted string data that has been translated from the first human language into the second human language, the writer module to import the translated string data into the localizable files to produce a translated localizable file that includes the imported translated string data. Preferably, but optionally, the software package is a power monitoring software product. The translator optionally determines whether the pixel length of a string in the translated string data exceeds a predetermined threshold and, if so, providing an indication that the pixel length of the string is too long.

The system may further include a packager coupled to the writer module, the packager to package the translated localizable file together with the non-localizable file in a storage medium without requiring recompilation of the non-localizable file. The system may further include a second reader coupled to the translator to read data in a second source format; and a second writer coupled to the translator to write translated string data in the second source format.

The reader may read data in the at least one source format and the writer may write the translated string data in the at least one source format.

According to still another aspect of the present invention, an article of manufacture for translating a localizable file including string data from at least one source in a first human language, the localizable file being part of a software product including localizable files and non-localizable files, the article of manufacture includes: a computer-readable medium; and a plurality of instructions wherein at least a portion of said plurality of instructions are storable in said computer-readable medium, and further wherein said plurality of instructions are configured to cause a processor to: extract string data from the localizable file; export the extracted string data to a formatted file; receive a translated formatted file including a translation of the string data from the first human language to a second human language; and import the translated string data into the localizable file to produce a translated localizable file that includes the imported translated string data.

The plurality of instructions may further cause the processor to determine whether the pixel length of a string in the translated string data exceeds a predetermined threshold and, if so, provide an indication that the pixel length of the string is too long.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings, in which:

FIG. 2A is an exemplary flow chart diagram of a process used by an HTML read/write module of the translation system in FIG. 1A to read and write localizable HTML files;

FIG. 5A-5B are exemplary screen shots of intermediate spreadsheet outputs produced by the translation system in FIG. 1A.

DETAILED DESCRIPTION OF THE ILLUSTRATED EMBODIMENTS

Figure 1A:
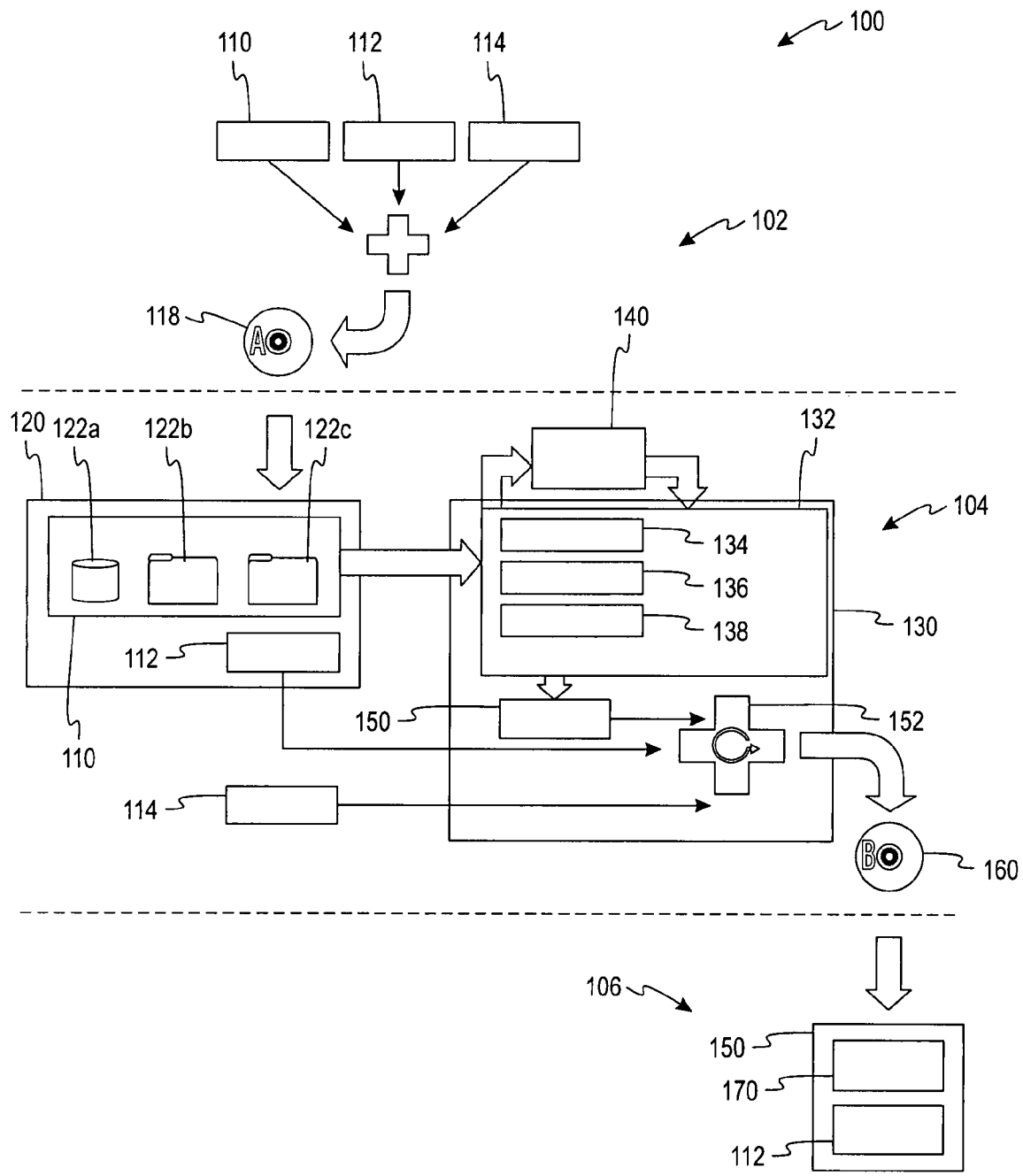
FIG. 1A is a functional block diagram of a translation system in accordance with an embodiment of the present invention.

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

An aspect of the present invention provides a translation system that includes a translation tool that facilitates the translation of different sources of text strings (e.g., .resources, .HTML, .SQL). The translation tool facilitates third-party translation to export and import in a common file format such as .XLS. The translation process allows a software developer to design a software product in a given human language, which may be translated by a third-party translator who needs no knowledge of programming and without requiring the recompilation of any binary files or non-localizable files that comprise the software product. By using the translation tool, the Local Adaptation Center (LAC) in the target country can generate an install product in the target human language that can be distributed on a computer-readable medium, such as a CD-ROM, to the end user.

The translation tool extracts strings to be translated from a variety of sources within a software product such as text files, NET resource files, HTML files and SQL (database) files. The translation tool reads these strings and saves them in a common file format and presents a list of the strings to the user of the translation tool in a user-friendly interface, such as via a spreadsheet. For each source type, the translation tool provides a reader/writer module that is adapted to extract the text strings from the source and to replace those text strings with the translated text strings. If a new source type (e.g., files in .PDF format) for a software product needs to be translated, a new reader/writer module may be written to support the new type of file. The reader/writer module may be added to the translation tool.

Any number of operations may be performed by the reader/writer module before or after translation has occurred. For example, an encrypted file may be decrypted, have strings extracted, export the strings for translation, import the translated strings, and re-encrypt the file. The user may enter the translations manually in the user interface (UI), or export the strings to a common file format such as .XLS (Microsoft® Excel® format). The user may have the strings translated by a third-party vendor and then import the translations via the translation tool. The translation tool also validates for the pixel length of the translated string to ensure that the translated strings are not too long for the UI in the translated software product. The translation tool calls a utility to package the translated files into an installer (such as MSI, InstallScript, etc.) to generate a language-specific install for that software product, which may be distributed to an end-user on a computer-readable storage medium such as a CD-ROM or DVD.

Some or all of these guidelines may be followed to implement the translation methods and systems described herein.

1. The application should separate strings from the compiled code, and strings should be identified with a unique ID or key. A code example showing strings stored in the form of a unique ID/key=value is provided below.
2. The application should package the translated deliverables into an installer that can be carried out by LACs with no involvement from the software developer.
3. The application should specify what content needs to be translated and where that content is located.
4. The translation tool should extract strings from a variety of sources within a product, such as .NET resource files, HTML files, databases (SQL), etc. If a new source type needs to be translated for a product, the translation tool should be extensible to provide such a capability.
5. The translation tool should present the extracted strings to the user in a friendly UI. The user may enter the translations via the UI or (a) export the strings to a commonly used format, (b) have the strings translated by a third-party translator or a translation engine, and (c) import the translated strings back into the translation tool.
6. The translation tool should validate for the pixel length of the translated strings to ensure that the translated strings are not too long for the product UI.
7. The translation tool should store the translations so that the user can carry out the translations in steps. The user can translate only some of the strings initially, save the work, and return later to translate the remaining strings. The translation tool should store all the translations and allow the user to resume translations from where the user last left off.

An example of how the strings are stored in the form of unique ID/key=value pairs follows:

frmmain.tabcontrolmain.tabpage_reportbuilder.
  ucreportsbuilder1.ucreportbuil der.grpstep6.text=Step 6
frmmain.tabcontrolmain.tabpage_reportbuilder.
  ucreportsbuilder1.ucreportbuil der.grpstep1.text=Energies By Day The value corresponds to the actual string displayed on the user interface (UI) and the unique ID or key corresponds to the names of all of the controls in the hierarchy. Thus, each string value is identified by a unique ID or key.

Turning now to the drawings and initially to FIG. 1A, a functional block diagram of a translation system 100 is shown. The translation system 100 involves a developer 102, a foreign country vendor 104 (i.e., foreign relative to the developer) an end-user 106, and a third-party translator 140. In this example, the developer 102 develops and compiles software having strings in a first, native human language such as English, while the foreign country vendor 104 and the end-user 106 operate using a target human language such as French. The developer 102 creates a software product that includes localizable files 110, non-localizable files 112, and an install packaging utility 114. The localizable files 110 include strings that are written in a first human language, such as English in this example, and require translation into another human language or languages. The localizable files 110 may include string information from a variety of sources, such as NET resource files, HTML files, or SQL files. The non-localizable files 112 may include files, such as binaries (EXE files), DLLs (library assemblies), which do not require translation for operation in other countries. The non-localizable files 112 will remain the same across all language versions of the software product. The different files 110, 112, and 114 are stored on a computer-readable storage medium 118, which in this example is a CD-ROM produced by the developer 102. In this example, the computer-readable storage medium 118 is the packaging for the software product.

The computer-readable storage medium 118 is sent to the foreign country vendor 104 from the developer 102. The foreign country vendor 104 installs the software stored on the storage medium 118 and also installs a translation tool 130, which is also stored on the storage medium 118. Following the installation, the computer of the vendor 104 includes a plurality of installed files 120 and a translation tool 130. The installed files 120 include the localizable files 110, the non-localizable files 112, the install packaging utility 114, and the translation tool 130. The localizable files 110 include files of various sources, including one or more SQL files 122a, one or more .NET resource files 122b, one or more HTML files 122c, and so on. The translation tool 130 includes a translation tool engine 132 that accesses various reader/writer modules 134, 136, 138 as described below and produces localized files 150 after the translator 140 translates the strings in the localizable files 110 from the original human language into the target human language.

For each source type in the localizable files 110, the translation tool 130 includes a corresponding reader/writer module that extracts the strings from each type of source file and replaces those strings with strings translated by the third-party translator 140. Thus, the SQL files 122a are processed by an SQL reader/writer module 134, the resource files 122b are processed by a Resource reader/writer module 136, and the HTML files 122c are processed by an HTML reader/writer module 138 within the translation tool 130. Each of these modules 134, 136, 138 extracts all strings to be translated from the source files each is adapted to read and then replaces those strings with the translated strings after the third-party translator 140 has translated them. Examples of the modules 138, 134 are described in connection with FIGS. 2a and 2b below.

The translation tool 130 produces new localized files 150 that include strings translated into the target human language by the translator 140. Note that the translator 140 may be a machine translator that automatically translates the strings from a first human language into a target human language.

Though three exemplary reader/writer modules 134, 136, 138 are shown in the translation engine 132, fewer or additional reader/writer modules for other source file types (such as PDF as a non-limiting example) may be present depending upon the types of source files present in the localizable files 110.

The translation tool engine 132 produces the translated localized files 150. The translated localized files 150 from the translation tool engine 132, the non-localizable files 112, and the packaging utilities 114 are provided to an installer 152, such as a Windows Installer XML toolset (commonly known as WiX), provided by Microsoft under Common Public License. The installer 152 produces a set of install files that are written to the computer-readable storage medium 160 to create the translated software product. A configuration file, such as a WiX configuration file, includes source path mappings for each of the files that need to be packaged into the installer 152. The configuration file obtains the non-localizable content from the installation directory and the localizable content from a staging folder. The translation tool 130 copies all the translated files from the staging folder and then calls the WiX utility to package all the files together into an install.

The storage medium 160 may then be packaged for use in the target country. In this example, the target human language may be French. The end user 106 may install the translated software product from the set of install files on a computer. The set of installed files 150 include the translated localized files 150 and the non-localizable files 112.

Figure 1B:
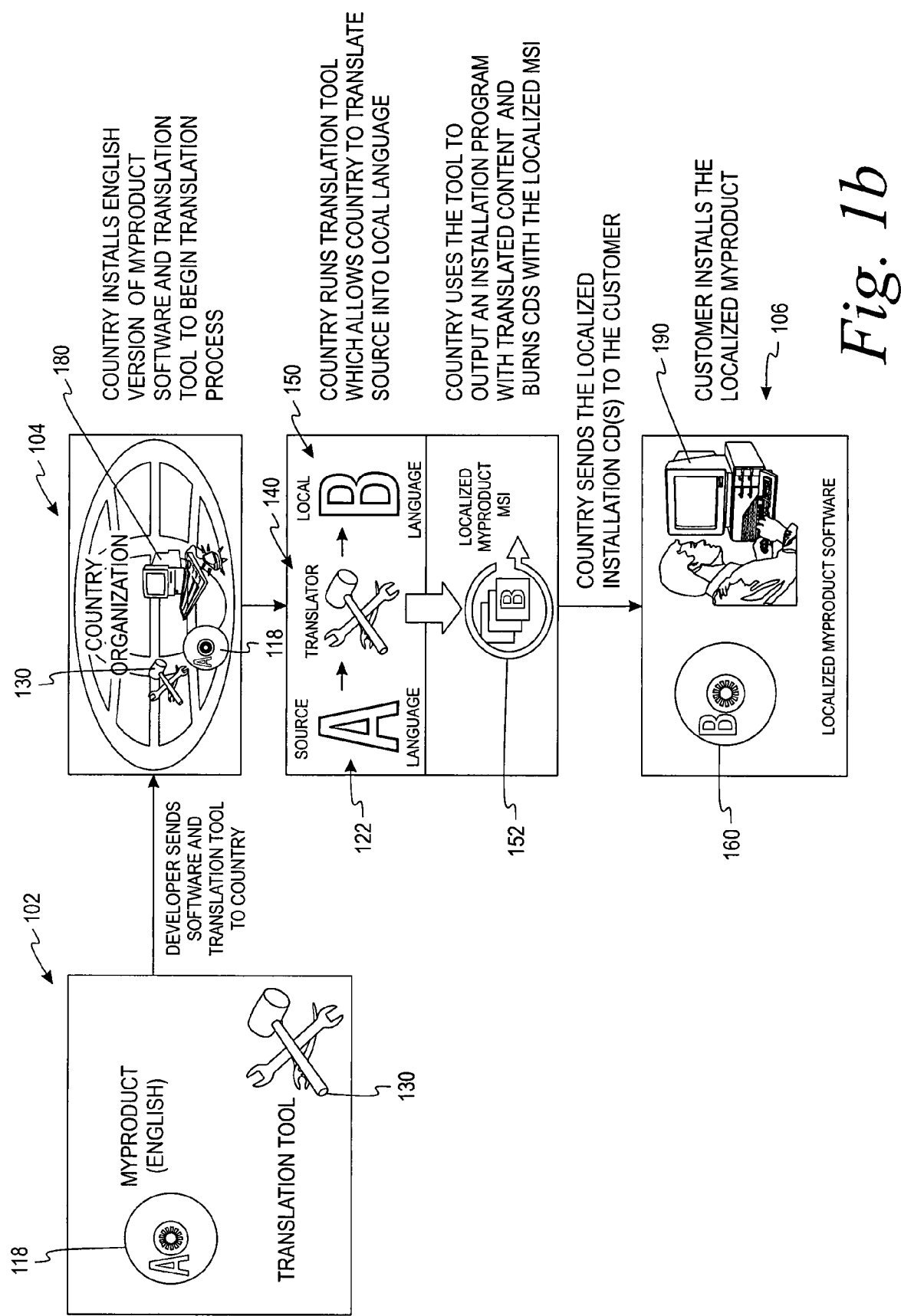
FIG. 1B is a block diagram of the selected components of the translation system in FIG. 1A employed in the translation process.

FIG. 1B is a block diagram of some of the components of the translation system in FIG. 1A that may be involved in a translation process according to an aspect of the present invention. The developer 102 sends the software product (termed "MyProduct") on the storage medium 118 as well as the translation tool 130 to the foreign country vendor 104. In this example, the strings within MyProduct are in the English language. The foreign country vendor 104 installs onto a computer 180 the translation tool 130 and MyProduct 118 to begin the translation process. The foreign country vendor 104 also selects an appropriate translator computer program or third-party translator 140 to translate the localizable files 110 of the software product into the target human language. The translation tool 130 accesses the reader/writer modules 134, 136, 138 to convert the text strings of the various files that comprise the localizable files 110 to a common file format used by the translator 140. The output of the translator 140 is converted by the reader/writer modules 134, 136 and 138 to the appropriate source format of the respective files. The installer 152 is then used to output a set of install files based on the translated localizable files 150 and non-localizable files 112 to produce storage media for distribution. The end-user 106 obtains the storage medium 160 and then installs the translated software product onto a computer 190.

The translation tool 130 reads a configuration file, such as an XML file, which specifies which files need to be translated and where those files are located relative to the installation directory or folder of MyProduct. Exemplary XML code is provided below:

```
<Config>
  <SourcesOfText>
    <Source
    Format="RESOURCE"
    FolderPath=".\Bin\Resources"
    FileSearchPattern="*.htm;*.js"
    ID="PLTABLES" DisplayText="Real Time Tables"/>
  </SourcesOfText>
</Config>
```

The code specifies a Source element for each file format that needs to be translated. The Format attribute specifies the format of the file. The FolderPath attribute specifies the path, relative to the MyProduct installation directory, where that translatable element is located. The FileSearchPattern attribute specifies a search pattern to select the files for translation.

The flow diagrams in FIGS. 2A-2B, 3, and 4A-C include instructions that are representative of exemplary computer-readable instructions. The computer-readable instructions may be executed by: (a) a processor, (b) a controller, and/or (c) any other suitable processing device. The instructions may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire instruction set and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), discrete logic, etc.). For example, any or all of the processes, methods, and implementations described herein may be implemented by software, hardware, firmware, and/or any combination thereof. Also, some or all of the instructions, steps, acts, or processes represented in FIGS. 2A-2B, 3, and 4A-C may be implemented manually. Further, although specific examples are described with reference to the flowchart illustrated in FIGS. 2A-2B, 3, and 4A-C, persons of ordinary skill in the art will readily appreciate that many other implementations or examples may alternatively be used. For example, the order or sequence of execution of the blocks may be changed, and/or some of the blocks described may be changed, eliminated, or combined.

FIG. 2A is a flow chart diagram of an exemplary process carried out by the HTML reader/writer module 138 to extract text strings from HTML-type localizable files and to replace those strings with translated text strings to produce HTML localized files in the target human language. The reader/writer module 138 includes an HTML reader component 138a and an HTML writer component 138b. The reader component 138a is granted access to an HTML file 202 that includes text strings in the original human language (English in this example).

The reader component 138a loads the HTML file 202 (210). The reader component 138a searches for elements marked with predetermined translation tags (212). The translation tag includes a unique identification (ID) that identifies translatable elements within the HTML file 202. In a specific example, the translation tags may have the following format: <TRANSLATED ID="X">, where X is unique for each unique string in the HTML file 202. As discussed, each string in the HTML file that needs to be translated is identified by a <TRANSLATE> tag, examples of which are provided below:

```
<tr height=0 style='display:none;mso-height-source:userset;mso-height-alt:255'>
<td class=x124 colspan=5 style='mso-ignore:colspan'><TRANSLATE ID=ID_3">PowerView Real Time Data<TRANSLATE></TD>
<td colspan=7 class=x127 style='mso-ignore:colspan'> </TD>
<td class=x124> </TD>
</tr>
<tr height=0 style='display:none;mso-height-source:userset;mso-height-alt:255'>
<td class=x124 colspan=4 style='mso-ignore:colspan'><TRANSLATE ID="ID_4">Parameter</TRANSLATE></TD>
<td colspan=8 class=x127 style='mso-ignore:colspan'> </TD>
<td class=x124> </TD>
<td colspan=8 class=x127 style='mso-ignore:colspan'> </TD>
<td class=x124> </TD>
</tr>
```

The ID attribute identifies each string with a unique ID for each HTML file.

The reader component 138a writes each element value in a collection with the ID as an indexer of the collection (214). The reader component 138a serializes or saves the collection in a spreadsheet format, which includes the ID as well as the strings in the original human language. In this example, the collection is saved in a Microsoft® Excel® XLS) format, but other spreadsheet and non-spreadsheet formats may be used. The collection may be stored in any suitable file format, including a customized file format. The reader component 138a unloads the HTML file 202 from memory, producing a spreadsheet file 220 that is ready to be translated.

Note that although the strings are saved in a spreadsheet file 220, in other implementations, the translations can be made directly via the UI of the translation tool 130. This allows for in-house translations of software products without having to send the strings to be translated to a third-party vendor. It should be understood herein that the translations can be carried out via the UI provided by the translation tool 130 or via an external common file, such as a spreadsheet file, by a translator.

The spreadsheet file 220 is translated via the translator 140 (e.g., automatically via a machine or manually via a human or a combination thereof) in FIG. 1A to the target human language (French in this example) (222). The translator 140 saves the translated spreadsheet file 224, which includes translated strings in the target human language. The writer component 138b de-serializes the translated file 224 and recreates a collection of strings and their associated IDs (226). The writer component 138b loads the original HTML file 202 in memory (228). The writer component 138b loops through the collection, and, for each translatable element marked with an ID, the associated string is replaced with the translated string (230). After all the strings are replaced, the new translated HTML file is saved and unloaded from memory (232). A resultant translated HTML file 234 is made available for installation.

An exemplary HTML file is provided below to illustrate identification of text to be translated with <translate> tags:

```
<html><table><tr height=0 style='mso-height-source:userset;mso-height-
   alt:255'>
<td class=x124 colspan=5 style='mso-ignore:colspan'><TRANSLATE
   ID="ID__3">PowerView Real Time Data</TRANSLATE></TD>
<td colspan=7 class=x127 style='mso-ignore:colspan'> </TD>
<td class=x124> </TD>
</tr>
<tr height=0 style='display:none;mso-height-source:userset;mso-height-alt:
   255'><td class=x124 colspan=4 style='mso-ignore:
   colspan'><TRANSLATE ID="ID__4">Parameter</TRANSLATE>
   </TD>
<td colspan=8 class=x127 style='mso-ignore:colspan'> </TD>
<td class=x124> </TD>
<tr></table></html>
```

After the strings are translated to the target human language, the translation tool 130 uses the HTML reader/writer class to create an HTML file with the following contents:

```
<html><table><tr height=0 style='display:none;mso-height-
   source:userset;mso-height-alt:255'>
<td class=x124 colspan=5 style='mso-ignore:colspan'><TRANSLATE
   ID="ID__3">PowerView XXXX</TRANSLATE></TD>
<td   colspan=7 class=x127 style='mso-ignore:colspan'> </TD>
<td class=x124> </TD>
</tr>
<tr height=0 style='display:none;mso-height-source:userset;mso-height-
   alt:255'>
<td class=x124 colspan=4 style='mso-ignore:colspan'><TRANSLATE
   ID="ID__4">YYYY</TRANSLATE></TD>
<td colspan=8 class=x127 style='mso-ignore:colspan'> </TD>
<td class=x124> </TD>
</tr></table></html>
```

Where, PowerView XXXX and YYYY are strings in the target human language (chosen arbitrarily here for convenience).

Figure 2B:
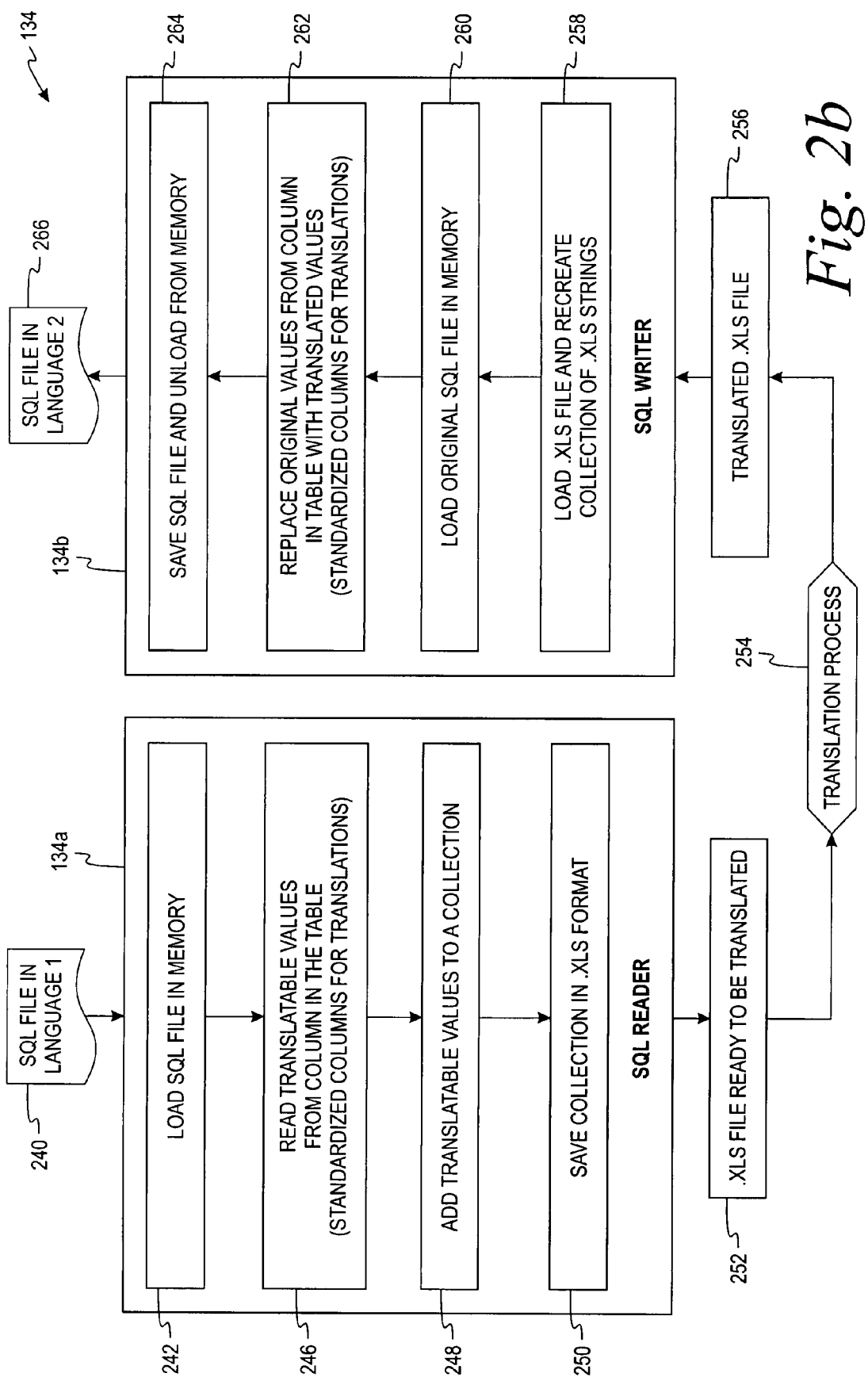
FIG. 2B is an exemplary flow chart diagram of a process used by an SQL read/write module of the translation system in FIG. 1A to read and write localizable SQL files.

FIG. 2B is a flow chart diagram of the process used by the SQL reader/writer module 134 to read and write localizable SQL files. The SQL reader/writer module 134 includes an SQL reader component 134a and an SQL writer component 134b. The reader component 134a is granted access to an SQL file 240, which is in the original human language (English in this example).

The reader component 134a loads the SQL file 240 into memory (242). Each SQL file includes a set of definitions and data per translatable table. The database table includes at least two columns, both of which include duplicates of the strings to be translated. The reader component 134a reads the translatable values from the columns in the SQL table (246), and writes the translatable values in a collection (248). The columns are standardized for translation. The reader component 134a saves the collection in a spreadsheet format or other file format. In this example, the collection is saved in Microsoft® Excel® (.XLS) format. The reader component 134a produces a spreadsheet file 252, which is ready to be translated.

The spreadsheet file 252 is translated via the translator 140 in FIG. 1A to the target human language (French in this example) (254). The translator 140 provides a translated file 256 to the writer component 134b. The writer component 134b loads the translated file 256 and recreates the collection of spreadsheet strings (258). The writer component 134b loads the original SQL file 240 in memory (260), and replaces the original values from the column in the table with the translated values (262). The other column still includes the strings in the original human language. After all strings in the appropriate column are replaced with the translated strings, the new translated SQL file is saved and unloaded from memory (264). A resultant translated SQL file 266 is made available for installation.

The Resource reader/writer 136 may be developed from the standard Class ResourceManager of the Microsoft® API. The ResourceManager class reads identification information and their associated strings. Strings are extracted by calling the GetString routine of the Resource.Manager and passing the identification information.

Figure 3:
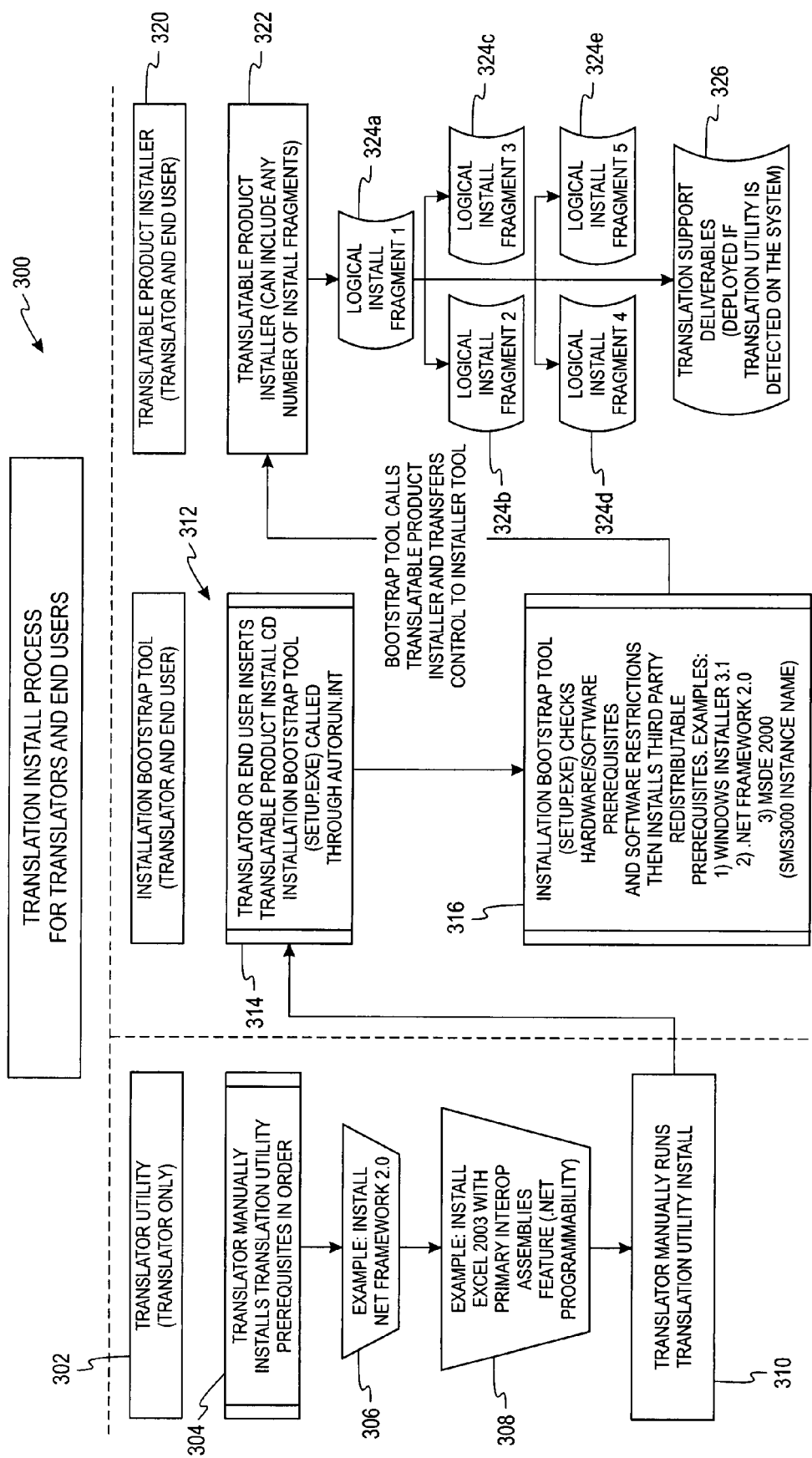
FIG. 3 is a flow chart diagram of an exemplary installation process carried out by the translation system of FIG. 1A.

FIG. 3 is a flow chart diagram of an exemplary installation process 300 for translators and end users of the translation system 100 of FIG. 1A. The installation process 300 includes a translator utility 302, an installation bootstrap tool 312, and a translatable product installer 320, which are used to install the translation tool 130 in FIG. 1A. The user (such as a foreign country vendor 104, which can be the translator 140) installs the requisite software needed to run the translation tool 130 (304). In this example, the user would install the .NET Framework 2.0 (306) and an appropriate version of Microsoft® Excel® with a primary interoperating assembly feature (i.e., .NET programmability) (308). The user runs the translation utility install (310) to install the translation tool 130 on the user's computer.

The end user or translator 140 runs the installation bootstrap tool 312 (314). In this example, the translation tool 130 is available via an install CD-ROM and calls a bootstrap tool (e.g., setup.exe) through an execution command (autorun-.int). The installation bootstrap tool 312 checks the hardware and software prerequisites (e.g., is an appropriate version of the .NET Framework installed?) and software restrictions of the system (316). The bootstrap tool 312 installs third party redistributable prerequisites. In this example, the prerequisites include Windows® Installer 3.1, NET Framework 2.0 or MSDE 2000 (SMS3000 Instance Name). The bootstrap tool 312 calls the translatable product installer 320 and transfers control to the installer tool 320. The installer tool installs all the necessary fragments of the translation tool 130 (322). In this example, five logical install fragments 324a-e are installed by the installer, but it is to be understood that any number of required fragments may be installed. The translation tool 130 and its translation support deliverables are ready for use (326) on the target system 180.

Figure 4A:
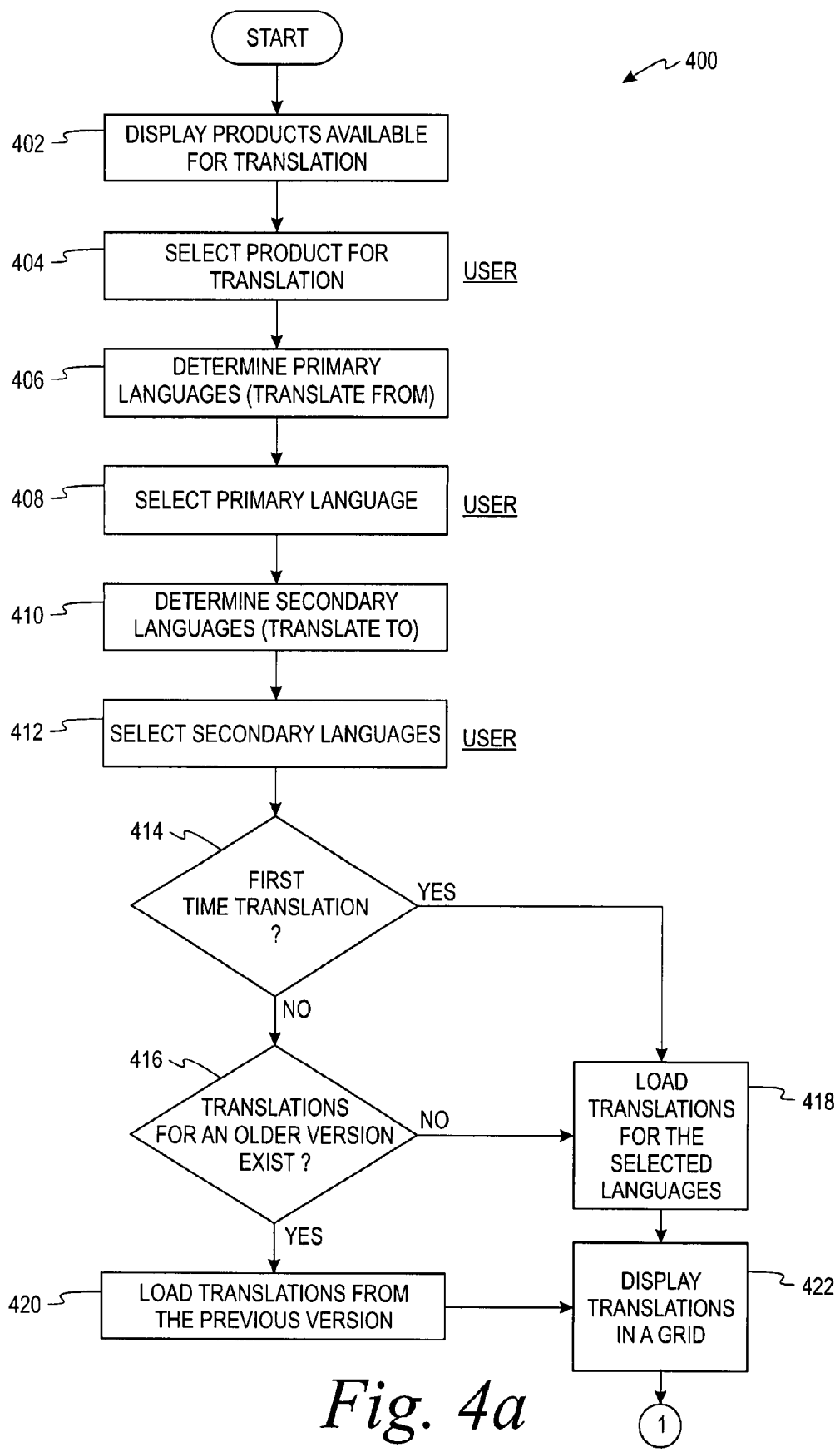
FIGS. 4A-4C are flow chart diagrams of the process followed to translate information using the translation system of FIG. 1A.
Figure 4B:
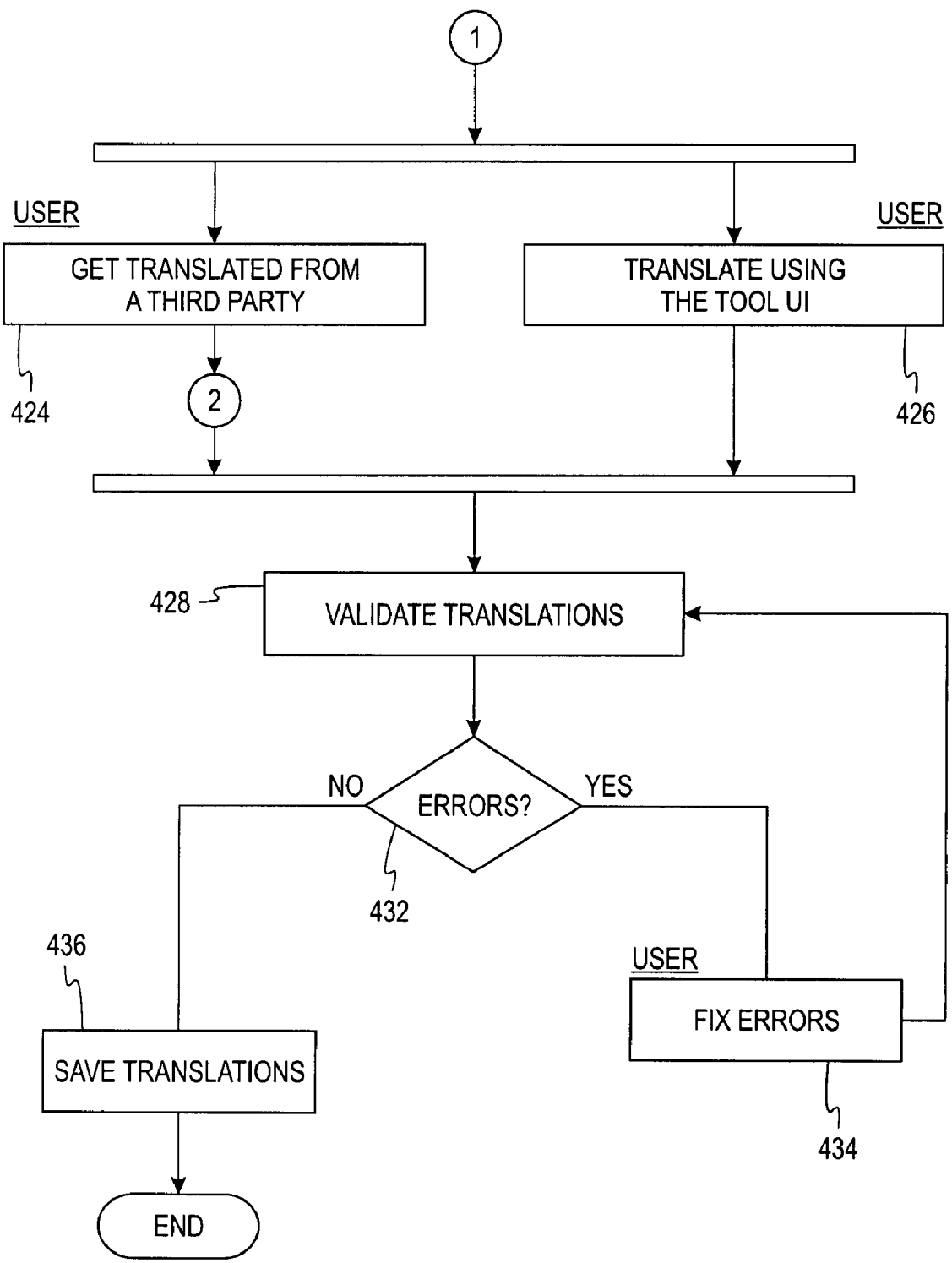
Figure 4C:
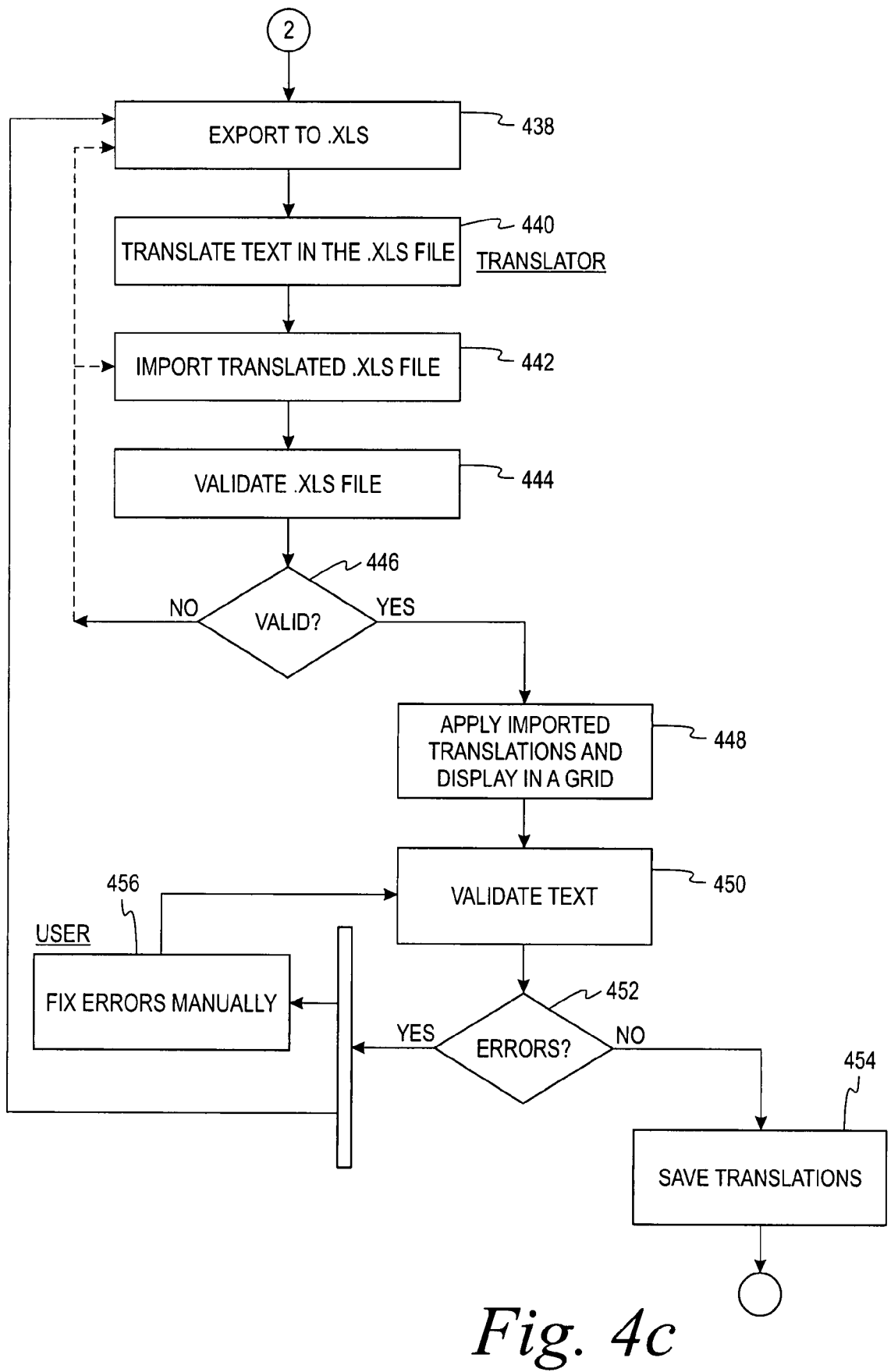

FIGS. 4A-4C are a flow chart diagram of an exemplary process or algorithm 400 followed to translate information with the translation system 100 of FIG. 1A, according to an aspect of the present invention. Software products available for translation are displayed (402). The user selects a software product for translation (404). The process 400 determines the primary human languages of the selected software product (406). The user selects a primary language to be translated (408). The process 400 determines the secondary languages that are available for translation (410). The user selects the secondary language or languages for translation (412).

The process 400 determines whether the requested translation has been performed previously (414). If the requested translation has been performed, the process determines whether translations of an older version of the software product exist (416). If the requested translation has not been previously performed (414), or a translation of an older version does not exist (416), the process 400 loads translations for the selected human languages (418). If translations for an older version of the software product exist (416), the process loads the translations from the previous version (420). The loaded translations from either blocks 418 or 420 are displayed in a grid (422) or other suitable UI so that the translator can begin translating the strings.

The user may either have the software product translated from a third party translator (424) or using the UI of the translation tool (426) to make the translations (see FIG. 4B). After the translations are completed and have been validated (428), the process 400 determines whether any errors are present (432). If errors are present (432), the process 400 allows a user to examine the output file and correct any errors (434). The user will not be permitted to save the translations until all errors have been addressed and corrected. Alternately, the user may optionally be provided with an override feature that permits acceptance of the translations even though errors have been noted. After a user has corrected any errors, the process 400 loops back to block 428 to validate the translations. If there are no errors (432), the process 400 saves the translated files (436).

If the translation is performed by a third party translator (424), the process calls the applicable reader/writer modules such as the reader/writer module 138 in FIG. 1A. The reader/writer module exports the data to a spreadsheet format (.xls in this example) (438). Once the file has been converted to a spreadsheet format (or any other suitable format), the translator 140 translates the text in the spreadsheet file from the original human language into the target human language (440). The translated spreadsheet file is imported (444) into the translation tool 130. The process 400 determines whether the imported file is a valid spreadsheet file (446). If the file is not valid, the process 400 loops back to block 438 to re-export the data. If the file is valid (446), the imported translations are applied and displayed in a grid or other UI format (448). The process 400 determines whether the text is valid (450). This may include running the text through a spell-checker and/or a grammar checker and validating the pixel length and/or height of the translated text. The process 400 determines whether there are any errors (452). If the translated text includes errors (452), the process 400 permits a user to examine the output file and to correct any errors (456). After a user has corrected any errors, the process 400 loops back to block 450 to validate the translations. If there are not errors (452), the process saves the translated files (454).

FIGS. 5A-5B are exemplary screenshots of a spreadsheet file 500 produced by the translation tool 130 for use by the translator 140 and a spreadsheet file 550 imported by the translation tool 130 in FIG. 1A. In this example, FIG. 5A shows a screenshot of an exported spreadsheet file 500. The spreadsheet file 500 is produced by the translation tool engine 132. The spreadsheet file 500 includes an ID column 502, a first language text column 504, a length column 506, a second language text column 508 and an error column 510. In this example, the user has selected English as the first human language and Chinese as the second (target) human language. The first language text column 504 contains the text in each of the selected files in English. The second language text column 508 has not been populated in FIG. 5A. As described above in the examples discussed in connection with FIGS. 2A and 2B, the spreadsheet file 500 is sent to the translator 140 where it is translated.

FIG. 5B is a screenshot of a translated spreadsheet file 550. The spreadsheet file 550 includes an ID column 552, a first language text column 554, a length column 556, a second language text column 558 and an error column 560. In this example, the user has selected English as the first language and Chinese as the second language. The first language text column 554 contains the text in each of the selected files in English. The second language text column 558 has now been populated with the Chinese characters which are translated from the respective English text in the respective cells of the first language text column 554. The example used in FIG. 5B shows completely arbitrary Chinese characters but those of skill in the art will understand that a true and accurate translation occurs. It should be noted that the Chinese characters shown do not necessarily reflect an accurate translation of the text in the first language text column 554. The error column 560 includes notations for any errors detected by the process. For example, a TXT_TOOLONG error message 562 indicates that the translated characters for one of text strings exceeds the allocated pixel length for the string (within any predetermined or user-selected margin). As explained above, the user is notified and may correct the error. In this example, the user could increase the pixel length to include the entirety of the translated string. The user may also correct any translated characters manually via the spreadsheet 550.

The translation tool 130 validates for the text length and height in pixels, not the number of characters because character widths differ across various scripts. The tool 130 may allow a predetermined margin over the corresponding string in the original human language, and this margin may be configurable by the user. For example, the configuration file of MyProduct 118 can specify the allowable pixel margin as follows:

<TEXTVALIDATION PercentageLengthMargin="30"/>

When the translation tool 130 validates the text length for the strings in MyProduct 118, it can allow up to 30% more length in pixels for the target human language. The user will not be permitted to save the translations if the translated text is longer than the allowed margin. In power monitoring software, this feature is important because it prevents valuable information from being omitted from the translated version of MyProduct. Because power monitoring software is used in dangerous environments, it is imperative that translated strings fit within the allotted pixel area so that all strings from the original software product are translated and can be displayed within the allotted areas in the translated software product.

The translation tool 130 can also store the translated files in a directory structure, retaining copies of translated files for each translated version of the software product. For example, an exemplary directory structure is provided below:

```
Translation Tool installdir
    Data
        MSI
            MyProduct_2.0
                MyProduct_2.0_English
                    RESOURCE
                        Data
                        HTML
                MyProduct_2.0_Spanish
                    RESOURCE
                        Data
                        HTML
```

The MyProduct_2.0_English\Resources folder includes all English-language resource files that need to be translated, and the MyProduct_2.0_English\HTML folder includes all of the English-language HTML files that need to be translated. Similarly, the MyProduct_2.0_Spanish\Resource folder includes all of the MyProduct localizable resource files with Spanish-language translations for the corresponding English-language strings. The MyProduct_2.0_Spanish\HTML includes the HTML files in the Spanish language.

Figure 6:
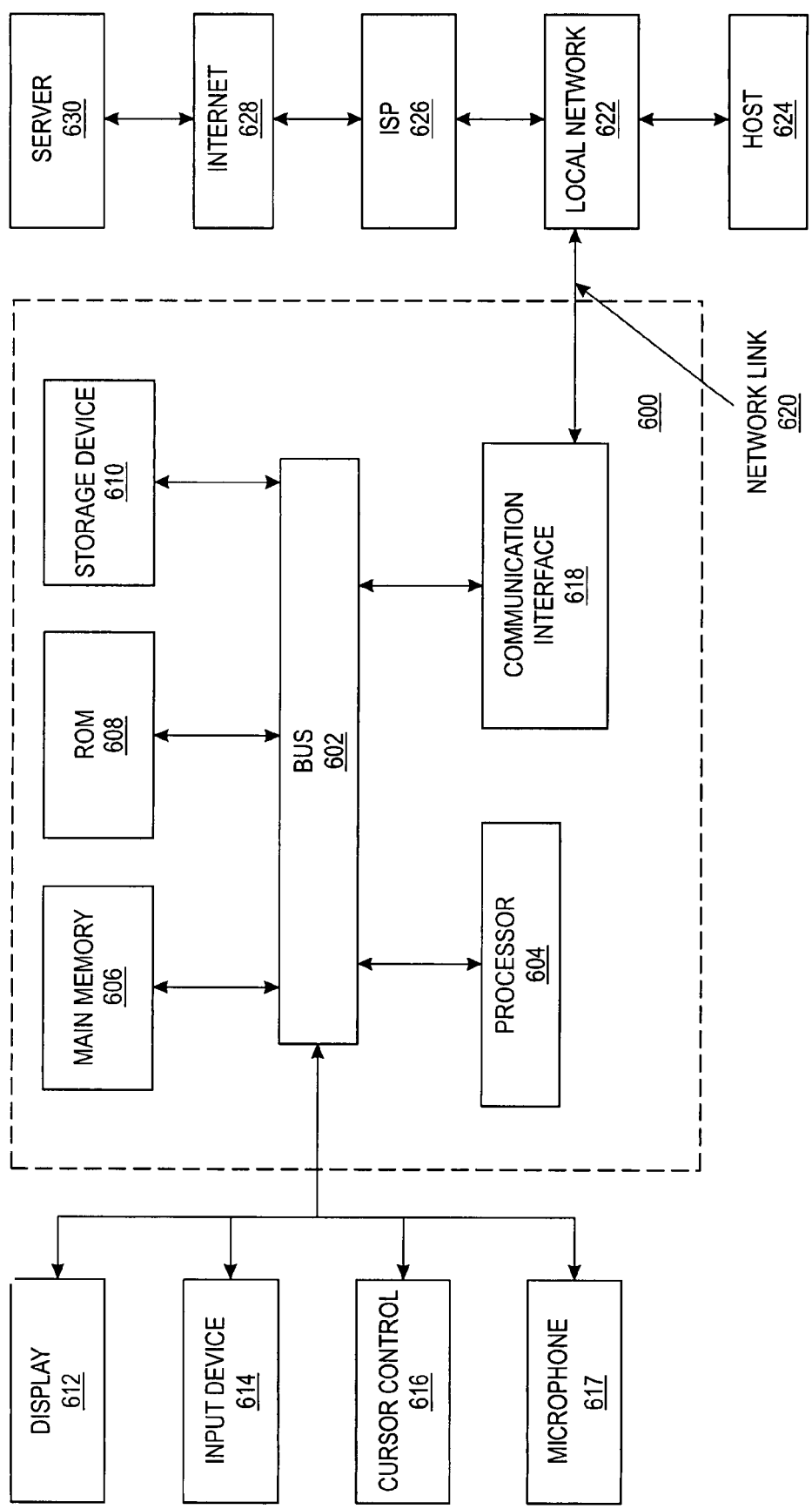
FIG. 6 is a block diagram that illustrates a computer system upon which embodiments of the invention may be implemented.

FIG. 6 is a block diagram that illustrates a computer system 600 upon which aspects of the invention may be implemented, including any of the implementations described in connection with FIGS. 1A-5B. Computer system 600 includes a bus 602 or other communication mechanism for communicating information, and a processor or processors 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as, for example, a magnetic disk or optical disk, is provided and coupled to bus 602 for storing information and instructions.

Computer system 600 may be coupled via bus 602 to a display 612, such as a cathode ray tube (CRT), liquid crystal display (LCD), or may be a handheld active or passive display, for displaying information to a computer user. An input device 614, including alphanumeric and other keys, is coupled to bus 602 for communicating information and command selections to processor 604. Other user input devices include cursor control 616 or microphone 617. Cursor control 616 may include one or more of any number of devices, such as, for example, a mouse, a trackball, or cursor direction keys for communicating direction information and command selections to processor 604 and for controlling cursor movement on display 612. The cursor control 616 typically has two degrees of freedom in two axes, a first axis (e.g., x) and a second axis (e.g., y), allowing the device to specify positions in a plane.

Execution of sequences of instructions contained in main memory 606 causes processor 604 to perform the processes, algorithms, and methods described above. For example, the main memory 606 may include the translation tool 130 that is installed onto the computer 180. One or more processors in a multi-processing arrangement may also be employed to execute the sequences of instructions contained in main memory 606. In alternative embodiments, hard-wired circuitry may be used in place of or in combination with software instructions and it is to be understood that no specific combination of hardware circuitry and software are required. Instructions may be provided in any number of forms such as source code, assembly code, object code, machine language, compressed or encrypted versions of the foregoing, and any and all equivalents thereof. "Computer-readable medium" refers to any medium that participates in providing instructions to processor 604 for execution and "program product" refers to such a computer-readable medium bearing a computer-executable program. The computer usable medium may be referred to as "bearing" the instructions, which encompass all ways in which instructions are associated with a computer usable medium. Computer-readable media include, but are not limited to, non-volatile media, volatile media, and transmission media. Non-volatile media include, for example, optical or magnetic disks, such as storage device 610. Volatile media include dynamic memory, such as main memory 606. Transmission media include coaxial cables, copper wire and fiber optics, including the wires that comprise bus 602. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be borne on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. Instructions received by main memory 606 may optionally be stored on storage device 610 either before or after execution by processor 604.

Computer system 600 may also include a communication interface 618 coupled to bus 602 to provide a two-way data communication coupling to a network link 620 connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network, now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information. Thus the processing required by method of the invention described by way of example herein may be implemented on a local computer utilizing storage device 610 or may be implemented, for example, on a LAN or over the Internet.

Computer system 600 can send messages and receive data, including program code, through the network(s), network link 620, and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. In this manner, computer system 600 may obtain application code in the form of a carrier wave.

The embodiments of the present invention can be applied to any assembly that requires its software to be translated into multiple languages. In particular, embodiments of the present invention are applied to software products for use in monitoring systems that monitor measurable quantities of a utility, including water, air, gas, energy, steam (collectively abbreviated as WAGES), and weather. For example, embodiments of the present invention can be applied to the PowerLogic® System Manager Software™, Billing Module, Interactive Graphics Module, PCS Powerlink G3 Software, or Active Pager Module commercially available from Square D Company. These software applications and modules are very complex and benefit greatly from the aspects of the present invention described herein.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A translation method, comprising:
compiling, by a developer using a computer system, a set of files including non-localizable files and localizable files into a set of install files, the localizable files including string data from at least one source in a first human language for translation into a target human language, the non-localizable files lacking data requiring translation from the first human language into the target human language, the install files for installation onto a computer, the non-localizable files including a computer-executable binary file;
extracting, by a foreign country vendor using a translation tool executed by a computer remote from the computer system, the string data and exporting the extracted string data to a formatted file, the foreign country vendor being located in a country different from the developer;
executing the translation tool independently of whether any of the non-localizable files are executed;
receiving, at the remote computer, a translated formatted file that includes translated string data, the translated string data corresponding to the extracted string data that has been at least partially translated from the first human language into a target human language;
importing, by the remote computer, the translated string data into the localizable files to produce translated localizable files and replacing the localizable files with translated localizable files that includes the imported translated string data; and
packaging the translated localizable files together with the non-localizable files into a set of target install files without requiring recompilation from source code to computer-executable code of any of the non-localizable files including the binary file.

2. The method of claim 1 wherein the set of files is a power monitoring software product.

3. The method of claim 1, further comprising:
determining whether the pixel length of a string in the translated string data exceeds a predetermined threshold and, if so, providing an indication that the pixel length of the string is too long.

4. The method of claim 1, further comprising:
translating the extracted string data from the first human language into the target human language to produce the translated string data.

5. The method of claim 1, wherein the at least one source is in an HTML, SQL or .NET resource format.

6. The method of claim 1, wherein the formatted file is in a spreadsheet format.

7. The translation method of claim 1, further comprising reading, by the computer remote from the computer system, a configuration file that specifies the localizable files to be translated from the first to the target human language and the respective locations of the localizable files in an installation directory in which the install files were installed.

8. A system to translate a software package including a non-localizable file and a localizable file, the localizable file including string data from at least one source in a first human language for translation into a second human language, the non-localizable file lacking data requiring translation from the first to the second human language, the system comprising:
an extractor to receive the localizable file, the localizable file and the non-localizable file having been compiled by a computer system remote from the extractor to produce a set of install files,
a reader module remote from the computer system and coupled to the extractor, the reader module to extract the string data from the localizable file and export the extracted string data to a formatted file;
a translator coupled to the reader, the translator receiving a translated formatted file that includes translated string data corresponding to the extracted string data that has been at least partially translated from the first human language to the second human language; and
a writer module coupled to the translator, the writer to receive the translated formatted file that includes the translated string data, extracted string data that has been translated from the first human language into the second the writer module to import the translated string data into the localizable files to produce a translated localizable file that includes the imported translated string data, the writing module providing the translated localizable file to a packager for packaging the translated localizable file together with the non-localizable file into a set of target install files in a storage medium without requiring recompilation from source code to computer-executable code of the non-localizable file, the non-localizable file including a computer-executable binary file.

9. The system of claim 8 wherein the software package is a power monitoring software product.

10. The system of claim 8, further comprising the packager coupled to the writer module, the packager to package the translated localizable file together with the non-localizable file in the storage medium without requiring recompilation of the non-localizable file.

11. The system of claim 8, wherein the translator further determines whether the pixel length of a string in the translated string data exceeds a predetermined threshold and, if so, providing provides an indication that the pixel length of the string is too long.

12. The system of claim 8, wherein the at least one source is in at least one of an HTML, SQL or .NET resource formats.

13. The system of claim 8, wherein the formatted file is in a spreadsheet format.

14. The system of claim 8, wherein the reader reads data in the at least one source format and the writer writes the translated string data in the at least one source format.

15. The system of claim 14, further comprising:
a second reader coupled to the translator to read data in a second source format; and
a second writer coupled to the translator to write translated string data in the second source format.

16. The system of claim 8, further comprising a configuration file accessed by the extractor, the configuration file specifying the localizable file to be translated from the first to the second human language and the location of the localizable file in an installation directory in which the localizable file was installed.

17. An article of manufacture for translating a localizable file including string data from at least one source in a first human language, the localizable file being part of a software product including localizable files and non-localizable files, the article of manufacture comprising:

a non-transitory computer-readable medium; and
a plurality of instructions wherein at least a portion of said plurality of instructions are storable in said non-transitory computer-readable medium, and further wherein said plurality of instructions are configured to cause a processor to:
extract string data from the localizable file, the localizable file and the non-localizable files having been compiled from source code into computer-readable code by a computer system remote from the processor to produce a set of install files;
export the extracted string data to a formatted file;
receive a translated formatted file including a translation of the string data from the first human language to a second human language; and
import the translated string data into the localizable file to produce a translated localizable file that includes the imported translated string data and that is for packaging into a set of target install files together with the non-localizable files, the target install files being installable onto a computer without requiring recompilation of the non-localizable files from source code into computer-executable code.

18. The article of manufacture of claim 17, wherein the plurality of instructions further cause the processor to determine whether the pixel length of a string in the translated string data exceeds a predetermined threshold and, if so, provide an indication that the pixel length of the string is too long.

19. The article of manufacture of claim 16, wherein the plurality of instructions further cause the processor to read a configuration file that specifies the localizable file to be translated and the location of the localizable file in an installation directory in which the localizable file was installed.

* * * * *